United States Patent
Wan et al.

(10) Patent No.: US 11,981,759 B2
(45) Date of Patent: May 14, 2024

(54) PHOTOCURABLE COMPOSITION

(71) Applicant: CANON KABUSHIKI KAISHA, Tokyo (JP)

(72) Inventors: Fen Wan, Austin, TX (US); Weijun Liu, Cedar Park, TX (US); Timothy Brian Stachowiak, Austin, TX (US)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/664,037

(22) Filed: May 18, 2022

(65) Prior Publication Data

US 2023/0374167 A1 Nov. 23, 2023

(51) Int. Cl.
| | |
|---|---|
| *C08F 2/46* | (2006.01) |
| *C08F 2/50* | (2006.01) |
| *C08F 212/36* | (2006.01) |
| *C08F 222/10* | (2006.01) |
| *C08G 61/04* | (2006.01) |
| *C08K 5/13* | (2006.01) |
| *C08K 5/3417* | (2006.01) |

(52) U.S. Cl.
CPC ............... *C08F 2/50* (2013.01); *C08F 212/36* (2013.01); *C08F 222/102* (2020.02); *C08K 5/13* (2013.01); *C08K 5/3417* (2013.01)

(58) Field of Classification Search
CPC ............... C08F 2/46; C08F 2/50; C08G 61/04
USPC ................... 522/7, 6, 189, 184, 71, 1; 520/1
See application file for complete search history.

(56) References Cited

U.S. PATENT DOCUMENTS

| | | |
|---|---|---|
| 5,565,536 A | 10/1996 | Nishimura |
| 8,586,268 B2 | 11/2013 | Matsumoto |
| 8,940,464 B2 | 1/2015 | Matsumoto |
| 9,365,515 B2 | 6/2016 | Nishimae |
| 2017/0153544 A1 | 6/2017 | Fujiki |

FOREIGN PATENT DOCUMENTS

| | | | |
|---|---|---|---|
| CN | 101014569 | * | 8/2007 |
| EP | 2625166 B1 | | 9/2014 |
| JP | 2010210702 | * | 9/2010 |
| WO | 2016104748 A1 | | 6/2016 |
| WO | 2016111338 A1 | | 7/2016 |
| WO | 2017043474 A1 | | 3/2017 |

OTHER PUBLICATIONS

Takakuwa, JP 2010-210702 Machine Translation, Sep. 24, 2010 (Year: 2010).*
Tanabe et al., CN 101014569 Machine Translation, Aug. 8, 2007 (Year: 2007).*
Zbigniew Czech, Kowalczyk Agnieszka, Paulina Raganska, Adrian Antosik, Thermal Stability and Degradation of Selected Poly(Alkyl Methacrylates) used in the Polymer Industry, Journal of Thermal Analysis and Calorimetry, Dec. 4, 2014, 119(2):1157-1161, Springer Nature Switzerland AG, Cham CH, 2014.
Andrea Lauer, In-Depth Mechanistic Understanding of Photoinitiating Systems, Masters Thesis, Chapter 4, pp. 95-110, Karlsruhe DE, 2019.
Xinyue Guo, Weijie Wang, Decheng Wan, Ming Jin, Substituted Stilbene-based D-π-A and A-π-A Type Oxime Esters as Photoinitiators for LED Photopolymerization, European Polymer Journal, Aug. 5, 2021, vol. 156, Article 110617, Elsevier B.V. Amsterdam, NL, 2021.
Fatima Hammoud, Zhong-Han Lee, Bernadette Graff, Akram Hijazi, Jacques Lalevée, Yung-Chung Chen, Novel Phenylamine-Based Oxime Ester Photoinitiators for LED-Induced Free Radical, Cationic, and Hybrid Polymerization, Journal of Polymer Science, Jun. 12, 2021 59(15): 1711-1723, John Wiley & Sons, Hoboken, NJ, 2021.
Juan Xu, Guiping Ma, Kemin Wang, Juming Gu, Shan Jiang, Jun Nie, Synthesis and Photopolymerization Kinetics of Oxime Ester Photoinitiators, Journal of Applied Polymer Science, Aug. 2, 2011, 123(2):725-731, John Wiley & Sons, Hoboken, NJ, 2011.
Ruchun Zhou, Haiyan Pan, Decheng Wan, Jean-Pierre Malval, Ming Jin, Bicarbazole-Based Oxime Esters as Novel Efficient Photoinitiators for Photopolymerization Under UV-Vis LEDs, Progress in Organic Coatings, Aug. 2021, vol. 157, Article 106306, Elsevier B.V. Amsterdam, NL.
Damian Nowak, Joanna Ortyl, Iwona Kamińska-Borek, Katarzyna Kukula, Monika Topa, Roman Popielarz, Photopolymerization of Hybrid Monomers: Part I: Comparison of the Performance of Selected Photoinitiators in Cationic and Free-Radical Polymerization of Hybrid Monomers, Polymer Testing, Dec. 2017, vol. 64, pp. 313-320, Elsevier B.V. Amsterdam, NL, 2017.
International Search Report and Written Opinion with regard to International Application No. PCT/2023/18298, dated Sep. 8, 2023, pp. 1-10.

* cited by examiner

*Primary Examiner* — Jessica Whiteley
(74) *Attorney, Agent, or Firm* — Abel Schillinger, LLP

(57) ABSTRACT

A photocurable composition can comprise a polymerizable material and at least one photoinitiator, wherein the polymerizable material comprises a multi-functional vinylbenzene monomer in an amount of at least 30 wt % based on the total weight of the polymerizable material and the at least one photoinitiator includes an oxime ester compound. The photocurable composition can be adapted that a UV shrinkage after forming a photo-cured layer at 23° C. is not greater than 4.0%; and that a thermal shrinkage after conducting a baking treatment of the photo-cured layer at 350° C. is not greater than 3.5%.

19 Claims, No Drawings

PHOTOCURABLE COMPOSITION

FIELD OF THE DISCLOSURE

The present disclosure relates to a photocurable composition, particularly to a photocurable composition adapted for inkjet adaptive planarization.

BACKGROUND

Inkjet Adaptive Planarization (IAP) is a process which planarizes a surface of a substrate, e.g., a wafer containing an electronic circuit, by jetting liquid drops of a curable composition on the surface of the substrate, and bringing a flat superstrate in direct contact with the added liquid to form a flat liquid layer. The flat liquid layer is typically solidified under UV light exposure, and after removal of the superstrate a planar surface is obtained which can be subjected to subsequent processing steps, for example baking, etching, and/or further deposition steps. There exists a need for improved IAP materials leading to planar cured layers with high thermal stability.

SUMMARY

In one embodiment, a photocurable composition can comprise a polymerizable material and at least one photoinitiator, wherein the polymerizable material comprises at least one multi-functional vinylbenzene monomer in an amount of at least 30 wt % based on the total weight of the polymerizable material; the at least one photoinitiator including an oxime ester compound; and the photocurable composition is adapted that a UV shrinkage after forming a photo-cured layer at 23° C. is not greater than 4.0%.

In another embodiment, the photocurable composition can be adapted that a photo-cured layer formed from the photocurable composition can have a thermal shrinkage after a baking treatment at 350° C. of not greater than 3.5%, the baking treatment including 2 minutes baking of the photo-cured layer on a stainless steel plate having a temperature of 350° C. under $N_2$ environment.

In one aspect, the oxime ester compound of the photocurable composition can have a structure of formula (1):

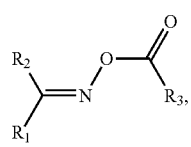

(1)

with $R_1$ being an aromatic ring system or a heteroaromatic ring system, $R_2$ being H or $C_1$-$C_8$ alkyl, $R_3$ being H or $C_1$-$C_8$ alkyl.

In a particular aspect, the oxime ester compound can include a structure of formula (2):

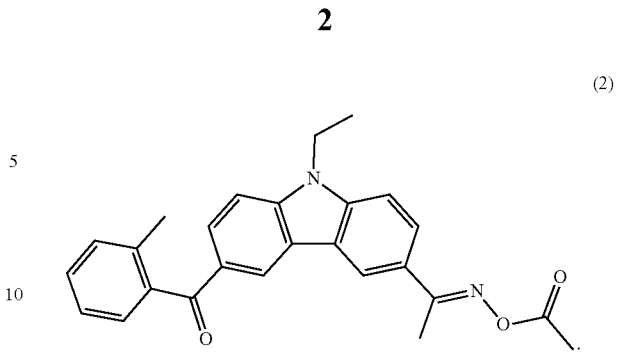

In another particular aspect, the oxime ester compound of the photocurable composition can include a structure of formula (3):

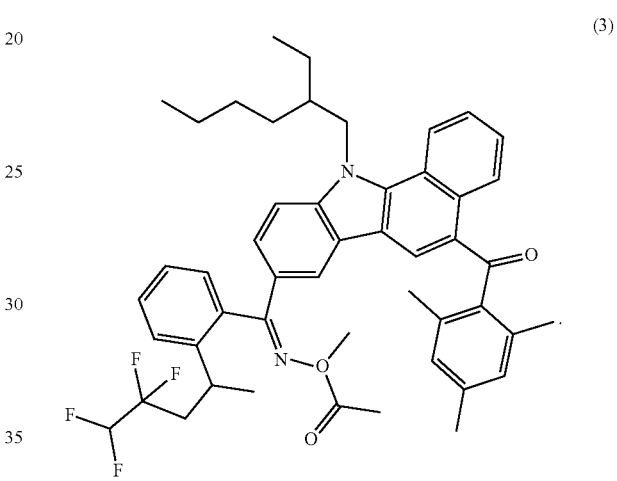

In one embodiment, the photocurable composition can further comprise at least 0.05 wt % 4-tert-butylcatechol (TBC).

In another embodiment of the photocurable composition, an amount of the oxime ester compound can be at least 1 wt % and not greater than 7 wt % based on a total weight of the photocurable composition.

In a certain aspect, the at least one photoinitiator can further include a photoinitiator not being an oxime ester compound.

In another aspect of the photocurable composition, an amount of the polymerizable material can be at least 85 wt % based on the total weight of the photocurable composition.

In one embodiment, the multi-functional vinylbenzene monomer of the polymerizable material can include at least three vinyl groups. In a certain aspect, the multi-functional vinylbenzene monomer can be a biphenyl compound including three vinyl groups.

In another embodiment of the photocurable composition, the polymerizable material can further include at least one multi-functional acrylate monomer. In a certain particular aspect, the multi-functional acrylate monomer can include at least one acrylate group and at least one vinyl group.

In yet another aspect of the photocurable composition, a total amount of the multi-functional vinylbenzene monomer and of the multi-functional acrylate monomer can be at least 85 wt % based on the total weight of the polymerizable material.

In a further aspect, the polymerizable material of the photocurable composition can have a weight % ratio of the multi-functional vinylbenzene monomer to the multi-functional acrylate monomer can range from 2:1 to 1:2.

In a further aspect, the viscosity of the photocurable composition can be not greater than 50 mPa·s.

In one embodiment, a method of forming a photo-cured layer on a substrate can comprise: applying a layer of a photocurable composition on the substrate, wherein the photocurable composition comprises a polymerizable material and at least one photoinitiator, the polymerizable material comprising at least one multi-functional vinylbenzene monomer in an amount of at least 30 wt % based on the total weight of the polymerizable material; and the at least one photoinitiator including an oxime ester compound; bringing the photocurable composition into contact with a template or a superstrate; irradiating the photocurable composition with light to form a photo-cured layer; and removing the template or the superstrate from the photo-cured layer.

In one aspect of the method, irradiating the photocurable composition can be conducted with UV light, and a UV shrinkage after forming the photo-cured layer may be not greater than 4.0%.

In another aspect of the method, the photo-cured layer can have a thermal shrinkage after a baking treatment at 350° C. of not greater than 3.5%, the baking treatment including 2 minutes baking under $N_2$ of the photo-cured layer on a stainless steel plate having a temperature of 350° C.

In another embodiment, a method of manufacturing an article can comprise: applying a layer of a photocurable composition on the substrate, wherein the photocurable composition comprises a polymerizable material and at least one photoinitiator, the polymerizable material comprising at least one multi-functional vinyl benzene monomer in an amount of at least 30 wt % based on the total weight of the polymerizable material; and the at least one photoinitiator including an oxime ester compound; bringing the photocurable composition into contact with a template or a superstrate; irradiating the photocurable composition with light to form a photo-cured layer; removing the template or the superstrate from the photo-cured layer; forming a pattern on the substrate; processing the substrate on which the pattern has been formed in the forming; and manufacturing an article from the substrate processed in the processing.

DETAILED DESCRIPTION

The following description is provided to assist in understanding the teachings disclosed herein and will focus on specific implementations and embodiments of the teachings. This focus is provided to assist in describing the teachings and should not be interpreted as a limitation on the scope or applicability of the teachings.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the imprint and lithography arts.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, and unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The present disclosure is directed to a photocurable composition comprising a polymerizable material and a photoinitiator, wherein the photoinitiator may include an oxime ester compound and the polymerizable material can comprise a multi-functional vinylbenzene monomer in an amount of at least 30 wt %.

The photocurable composition of the present disclosure can have the advantage of being usable in inkjet adaptive planarization (IAP) processing by having a low viscosity, low shrinkage during curing and an exceptional high thermal stability.

In one embodiment, the photocurable composition of the present disclosure can be adapted that a UV shrinkage after forming a photo-cured layer at 23° C. may be not greater than 4.0%, or not greater than 3.5%, or not greater than 3.0%.

In another embodiment, a photo-cured layer formed from the photocurable composition can have a shrinkage after a baking treatment at 350° C. of not greater than 3.5%, the baking treatment including 2 minutes baking of the photo-cured layer on a stainless steel plate having a temperature of 350° C. In further aspects, the linear shrinkage after the baking treatment at 350° C. may be not greater than 3.0%, not greater than 2.5%, not greater than 2.0%, not greater than 1.5%, or not greater than 1.0%, or not greater than 0.5%.

In one embodiment, the oxime ester compound of the photoinitiator can have a structure of formula (1):

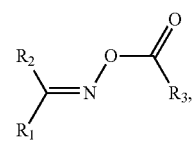

(1)

with $R_1$ being an aromatic ring system or a heteroaromatic ring system, $R_2$ being H or $C_1$-$C_8$ alkyl, $R_3$ being H or $C_1$-$C_8$ alkyl.

In a particular embodiment, the oxime ester compound can have a structure of formula (2):

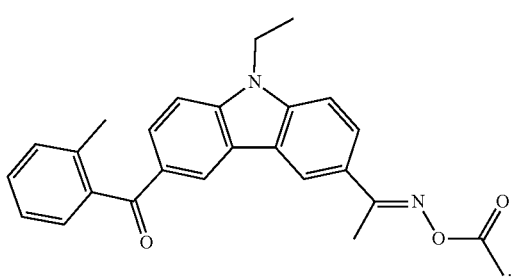 [SMILES: CCn1c2ccc(C(=O)c3ccccc3C)cc2c2cc(/C(C)=N/OC(C)=O)ccc21]

In another particular embodiment, the oxime ester compound may have a structure of formula (3):

(3)

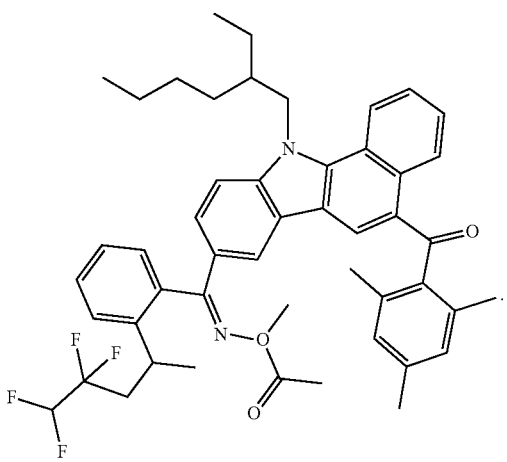

In a further particular aspect, the oxime ester can have a structure of formula (4):

(4)

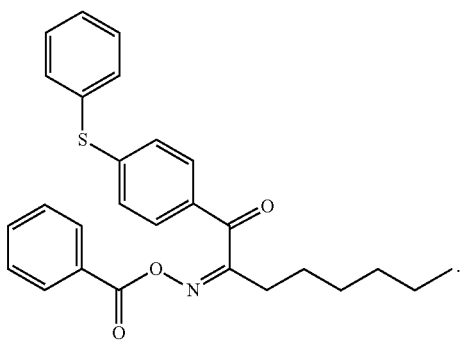

The amount of the oxime ester compound of the photoinitiator can be at least 1.0 wt % based on the total weight of the photocurable composition, or at least 1.5 wt %, or at least 2.0 wt %, or at least 2.5 wt %, or at least 3.0 wt %, or at least 3.5 wt %, or at least 4.0 wt %. In another aspect, the amount of the oxime ester compound may be not greater than 10 wt % based on the total weight of the photocurable composition, or not greater than 8 wt %, or not greater than 7 wt %, or not greater than 6 wt %, or not greater than 5 wt %, or not greater than 4 wt %. The amount of the oxime ester compound of the photoinitiator can be a value between any of the minimum and maximum numbers noted above.

In a certain aspect, the photoinitiator of the photocurable composition can further include at least one photoinitiator which is not an oxime ester compound.

The polymerizable material of the photocurable composition can be a major amount of the composition. In one embodiment, the amount of the polymerizable material can be at least 60 wt % based on the total weight of the photocurable composition, or at least 70 wt %, or at least 80 wt %, or at least 90 wt %, or at least 92 wt %, or at least 95 wt %.

As used herein, the term multi-functional vinylbenzene of the polymerizable material relates to a polymerizable monomer containing one or more benzene rings and at least two vinyl groups directly attached to the one or more benzene rings. In certain aspects, the multi-functional vinylbenzene can comprise at least three vinyl groups or at least four vinyl groups. In a particular aspect, the multi-functional vinylbenzene monomer can comprise two benzene rings and three vinyl groups attached to the benzene rings. A non-limiting example of such monomer can be 3,4',5-trivinyl-1,1'biphenyl (3VPH).

In one embodiment, the amount of the multi-functional vinylbenzene monomer can be at least 30 wt % based on the total weight of the polymerizable material, such at least 35 wt %, at least 40 wt %, at least 50 wt %, at least 60 wt %, at least 70 wt %, at least 80 wt %, at least 90 wt %, or at least 95 wt %. In another aspect, the amount of the multi-functional vinylbenzene monomer may be not greater than 98 wt % based on the total weight of the polymerizable material, or not greater than 95 wt %, or not greater than 90 wt %, or not greater than 80 wt %, or not greater than 70 wt %, or not greater than 60 wt %, or not greater than 50 wt %. The amount of the multi-functional vinylbenzene monomer can be a value between any of the minimum and maximum numbers noted above.

In another embodiment, the polymerizable material can further comprise a multi-functional acrylate monomer. In one aspect, the multi-functional acrylate monomer can include at least two acrylate groups, or at least three acrylate groups, or at least four acrylate groups. In another aspect, the multi-functional acrylate monomer can include at least one acrylate group and at least one vinyl group. As used herein, the term acrylate monomer relates to substituted and non-substituted acrylate monomers. Non-limiting examples of substituted acrylate monomers can be $C_1$-$C_8$ alkylacrylate, for example, methacrylate or ethylacrylate. Furthermore, as used herein, the term "vinyl group" does not relate to a vinyl group which is part of an acrylate group and is a functional group by itself.

In a particular aspect, the multi-functional acrylate monomer can include one acrylate group and two vinyl groups and an aromatic ring structure, for example, one or more benzene rings.

The amount of the multi-functional acrylate monomer can be at least 20 wt % based on the total weight of the polymerizable material, or at least 30 wt %, or at least 40 wt %, or at least 50 wt %, or at least 60 wt %. In another aspect, the amount of the multi-functional acrylate monomer may be not greater than 70 wt % based on the total weight of the polymerizable material, or not greater than 60 wt %, or not greater than 50 wt %. The amount of the multi-functional acrylate monomer can be a value between any of the minimum and maximum numbers noted above.

In one aspect, the polymerizable material can consist essentially of the multi-functional vinylbenzene monomer and the multi-functional acrylate monomer. In a particular aspect, a weight % ratio of the multi-functional vinylbenzene monomer to the multi-functional acrylate monomer can range from 2:1 to 1:2, or from 1.5:1 to 1:1.5. As used herein consisting essentially of the multi-functional vinylbenzene monomer and the multi-functional acrylate monomer means that not more than 1 wt % of the polymerizable material include other types of polymerizable monomers, oligomers, or polymers.

In other aspects, the polymerizable material can include next to the multi-functional vinylbenzene monomer and the multi-functional acrylate monomer other types of polymerizable compounds, for example, mono-functional monomers, or polymerizable oligomers, or polymerizable polymers. An amount of the other polymerizable compounds can be at least 1 wt % based on the total weight of the polymerizable material, or at least 5 wt %, or at least 10 wt %. In another aspect, the amount of other polymerizable compounds may not be greater than 30 wt %, or not greater than 20 wt %, or not greater than 15 wt %, or not greater than 10 wt %.

In a particular aspect, the photocurable composition can be essentially free of a maleimide monomer. Essentially free of a maleimide monomer means herein that not more than 0.5 wt % of the polymerizable material may be a maleimide monomer. In another aspect, the photocurable composition can be free of a maleimide monomer.

In order to stabilize the multi-functional vinylbenzene monomer in the photocurable composition (preventing unwanted polymerization during storage), a suitable stabilizer can be added to the composition. In one aspect, the photocurable composition can include 4-tert-butylcatechol (TBC) as a stabilizer in an amount of at least 0.05 wt % based on the total weight of the photocurable composition. In certain aspects, the amount of TBC can be at least 0.1 wt % based on the total weight of the photocurable composition, or at least 0.2 wt %, or at least 0.3 wt %. In another aspect, the amount of TBC may be not greater than 1 wt % based on the total weight of the photocurable composition, or not greater than 0.5 wt %, or not greater than 0.3 wt %, or not greater than 0.2 wt %.

In a certain embodiment, the photocurable composition of the present disclosure can be essentially free of a solvent.

As used herein, if not indicated otherwise, the term solvent relates to a compound which can dissolve or disperse the polymerizable monomers but does not itself polymerize during the photo-curing of the photocurable composition. The term "essentially free of a solvent" means herein an amount of solvent being not greater than 5 wt % based on the total weight of the photocurable composition. In a certain particular aspect, the amount of a solvent can be not greater than 3 wt %, not greater than 2 wt %, not greater than 1 wt %, or the photocurable composition can be free of a solvent, except for unavoidable impurities.

In another aspect, the photocurable composition and the present disclosure can comprise a solvent in an amount higher than 5 wt % based on the total weight of the photocurable composition. In a particular aspect, the amount of solvent can be at least 7 wt % based on the total weight of the photocurable composition, or at least 10 wt %, or at least 15 wt %, at least 20 wt %, or at least 25 wt %. In another aspect, the amount of solvent may be not greater than 40 wt %, or not greater than 30 wt %, or not greater than 20 wt %, or not greater than 10 wt % based on the total weight of the photocurable composition.

In one embodiment, the curable composition of the present disclosure can have a low viscosity which may allow the use of these compositions in IAP applications. In one aspect, the viscosity of the curable composition at a temperature of 23° C. can be not greater than 50 mPa·s, such as not greater than 40 mPa·s, or not greater than 30 mPa·s, not greater than 20 mPa·s, not greater than 15 mPa·s, or not greater than 10 mPa·s. In another aspect, the viscosity may be at least 5 mPa·s, or at least 7 mPa·s. As used herein, all viscosity values relate to viscosities measured at a given temperature with the Brookfield method.

In a further aspect, the photocurable composition can contain at least one optional additive. Non-limiting examples of optional additives can be surfactants, dispersants, stabilizer, co-solvents, initiators, inhibitors, dyes, or any combination thereof.

In another embodiment, the present disclosure is directed to a laminate comprising a substrate and a photo-cured layer overlying the substrate, wherein the photo-cured layer can be formed from the photocurable composition described above.

In a certain aspect, the laminate can further include one or more layers between the substrate and the cured layer, for example an adhesion layer.

The present disclosure is further directed to a method of forming a photo-cured layer. The method can comprise applying the photocurable composition described above on a substrate; bringing the photocurable composition into contact with a template or superstrate; irradiating the photocurable composition with light to form the photo-cured layer; and removing the template or superstrate from the photo-cured layer.

In one aspect, the light irradiation can be conducted with light having a wavelength between 250 nm to 760 nm. In a preferred aspect, the light irradiation may be conducted with light having a wavelength between 300 nm and 450 nm.

The substrate and the solidified (photo-cured) layer may be subjected to additional processing to form a desired article, for example, by including an etching process to transfer an image into the substrate that corresponds to the pattern in one or both of the solidified layer and/or patterned layers that are underneath the solidified layer. The substrate can be further subjected to known steps and processes for device (article) fabrication, including, for example, curing, oxidation, layer formation, deposition, doping, planarization, etching, formable material removal, dicing, bonding, and packaging, and the like. In a certain aspect, the substrate may be processed to produce a plurality of articles (devices).

The cured layer may be further used as an interlayer insulating film of a semiconductor device, such as LSI, system LSI, DRAM, SDRAM, RDRAM, or D-RDRAM, or as a resist film used in a semiconductor manufacturing process.

As further demonstrated in the examples, it has been surprisingly found that photocurable compositions including certain combinations of an oxime ester compound as photoinitiator and multi-functional vinylbenzene as part of the polymerizable material can be very suitable for IAP processing. It was possible to balance parameters important for IAP processing, such as a low viscosity, UV curing speed, low shrinkage during UV curing to obtain a flat surface, and high heat stability in order to make downstream processes possible at temperatures, such as 350° C., or 400° C., or even 450° C.

EXAMPLES

The following non-limiting examples illustrate the concepts as described herein.

Example 1

Preparing of Photocurable IAP Compositions
A first set of photocurable compositions was prepared comprising 50 parts by weight 3,3'-divinylbiphenyl (DVBP), 50 parts by weight m-xylene diacrylate (MXDA), 1 part by weight of nonionic fluorosurfactant FS 3100 (from Dupont), 0.3 parts by weight 4-tert-butylcatechol (TBC) and 1 part or 2 parts by weight photoinitiator. The compositions were varied by using different types and amounts of oxime ester photoinitiators.

The following oxime ester photoinitiators were used: OXE01 (see structure 4 above); OXE02 (see structure 2 above), and OXE03 (see structure 3 above). Comparative compositions C1 and C2 contained typical photoinitiators well known for photocurable compositions adapted for IAP processing, and which are not oxime esters: Irgacure 819 and 907.

A summary of the first set of photocurable compositions is shown in Table 1.

TABLE 1

|  | S1 | S2 | S3 | S4 | S5 | C1 | C2 |
|---|---|---|---|---|---|---|---|
| OXE01 | 1 |  | 2 |  |  |  |  |
| OXE02 |  | 1 |  | 2 |  |  |  |
| OXE03 |  |  |  |  | 2 |  |  |
| Irgacure 819 |  |  |  |  |  | 2 |  |
| Irgacure 907 |  |  |  |  |  |  | 2 |
| UV shrinkage [%] | 2.60 | 4.0 | 3.70 | 4.00 | 4.00 | 4.30 | 4.9 |
| Thermal shrinkage [%] |  |  | 22.92 | 9.77 |  | 9.12 | 10.63 |
| Induction time [s] | 15 | 105 | 11.5 | 25.6 | 50 | 4.4 | 17.9 |
| Curing time [s] | 76 | 319 | 31.1 | 184 | 373 | 9.6 | 48.5 |
| Viscosity [mPa · s] | 13 | 13 | 13 | 13 | 13 | 13 | 13 |

A second set of photocurable compositions was prepared by combining the following ingredients: 40 parts by weight 3,4',5-trivinyl-1,1'-biphenyl (3VPH), 60 parts by weight 3,5-divinylbenzyl acrylate (DVBA), 1 part by weight of nonionic fluorosurfactant FS 3100 (from Dupont), 0.5 parts by weight TBC, and photoinitiator of varying type and amounts. The types of photoinitiator were the same as in the first set of photocurable compositions, except that as comparative examples was further used Irgacure 907. The amount of the photoinitiator varied by using 2-, 4-, and 6 parts by weight photoinitiator based on the total weight of the photocurable compositions.

A summary of the photocurable compositions of the second set can be seen in Table 2.

TABLE 2

|  | S6 | S7 | S8 | S9 | S10 | S11 | S12 | S13 | C3 | C4 | C5 | C6 | C7 | C8 |
|---|---|---|---|---|---|---|---|---|---|---|---|---|---|---|
| OXE01 | 2 |  |  | 4 |  |  |  |  |  |  |  |  |  |  |
| OXE02 |  | 2 |  |  | 4 |  | 6 |  |  |  |  |  |  |  |
| OXE03 |  |  | 2 |  |  | 4 |  | 6 |  |  |  |  |  |  |
| Irgacure 819 |  |  |  |  |  |  |  |  | 2 |  | 4 |  | 6 |  |
| Irgacure 907 |  |  |  |  |  |  |  |  |  | 2 |  | 4 |  | 6 |
| UV shrinkage [%] | 2.9 | 3.7 | 3.1 | 3.1 | 3.4 | 2.6 | 2.9 | 2.30 | 5.10 | 4.60 | 4.9 | 4.6 | 4.6 | 4.9 |
| Thermal shrinkage [%] | 18.8 | 2.5 | 2.5 | 13.6 | 1.0 | 2.1 | 0.3 | 1.67 | 8.3 | 9.0 | 4.1 | 6.5 | 2.2 | 4.9 |
| Induction Time [s] | 13.5 | 46.4 | 103 | 14.5 | 17.5 | 225 | 28.4 | 198 | 3.5 | 17.1 | 3.5 | 12 | 3.3 | 11 |
| Cure Time [s] | 32.9 | 195 | 555 | 28.7 | 38.9 | 795 | 57 | 446 | 8.2 | 67 | 6.7 | 47.7 | 6.9 | 38.6 |
| Viscosity [mPa · s] | 14 | 14 | 4 | 14 | 14 | 14 | 14 | 14 | 14 | 14 | 14 | 14 | 14 | 14 |

A further set of comparative photocurable compositions was prepared by using as polymerizable monomers the combination of 60 wt % MXDA and 35 wt % trimethylolpropane triacrylate, and 1 wt % surfactant FS2000M1. As photoinitiators were varied OXE02 and Irgacure 907 in amounts of 2 wt % and 4 wt %. A summary of the compositions and test results can be seen in Table 3.

TABLE 3

|  | C9 | C10 | C11 |
|---|---|---|---|
| OXE02 |  | 2 |  |
| Irgacure 907 | 2 |  | 4 |
| UV shrinkage [%] | 5.8 | 4.7 | 4.6 |
| Thermal shrinkage [%] | 7.08 | 5.65 | 4.55 |
| Viscosity [mPa · s] | 17 | 17 | 17 |

UV-Shrinkage

The photocurable compositions were cured using an Anton Paar MCR-301 rheometer coupled to a UV curing system and heater. The sample was radiated with a mercury UV lamp with a 365 nm band filter. The light intensity was set to 38 mW/cm$^2$ and the UV radiation was conducted at room temperature (23° C.).

Before starting with the UV radiation, the distance between glass plate and measuring unit was reduced to a gap of 0.1 mm. At the beginning of the UV radiation, radicals generated by the photoinitiators were consumed by the inhibitor present in the resist, wherefore the storage modulus did not increase until all inhibitor was gone. This time period was recorded as induction time. The UV radiation exposure was continued until a storage modulus of $1 \times 10^7$ Pa was obtained.

The thickness of the layers of the photocurable composition before curing was 35 microns, and the shrinkage was observed by tracking the change in the thickness of the layers during the UV curing. The UV shrinkage, herein also called linear shrinkage, was calculate as percent UV shrinkage ($S_{uv}$ [%]) according to the following equation: $S_{uv} = (T_p - T_c)/T_p$, with $T_p$ being the thickness of the liquid film of the photocurable composition before UV curing, and $T_c$ being the thickness of the photo-cured film after the curing (when reaching a storage modulus of $1 \times 10^7$ Pa.

As can be seen especially for the photocurable compositions in Table 1 and Table 2, compositions made with photoinitiators OXE01, OXE02, and OXE03 all had a lower shrinkage during UV curing than comparative compositions (C1-C8) using photoinitiators Irgacure 819 or Irgacure 907 at all photoinitiator concentrations.

It could be further observed that comparative compositions C9, C10, and C11 (see Table 3), which did not include a multi-functional vinyl monomer combined with a multi-functional acrylate monomer, but the combination of difunctional acrylate MXDA with a trifunctional acrylate monomer, did not have the desired low UV shrinkage; the UV shrinkage for these samples was greater than 4.5%.

Induction Time and Curing Speed

Further comparisons shown in Tables 1 and 2 are the induction time (the time until an increase of the storage modulus was measured) and the curing time (the time until a storage modulus of $1 \times 10^7$ Pa was obtained). It can be seen that especially photocurable compositions containing the oxime ester photoinitiators OXE01 and OXE02 were comparable in induction time and curing time (until a storage modulus of $1 \times 10^7$ Pa was obtained) with compositions containing the photoinitiators Irgacure 819 and Irgacure 907.

Thermal Shrinkage

The thermal shrinkage was determined according to the following procedure:

First, a UV-cured layer was prepared by depositing a 500 nm thick liquid film of the photocurable composition unto a blank fused silica template. For the measurement, the Anton Paar MCR-301 rheometer coupled with a Hamamatsu Lightningcure LC8 UV source described above was used. The liquid film was radiated with a light intensity of 38 mW/cm² at 365 nm for 263 seconds, which corresponds to a curing energy dosage of 10 J/cm².

The photo-cured film was subjected to a high temperature baking treatment by placing the UV-cured film for two minutes on a hot plate having a temperature of 350° C. under nitrogen. The thickness of the film before and after the baking was measured with a JA Woollam Spectroscopic Ellipsometer M-2000 X-210. The thermal shrinkage (St) was calculated according to the equation: $St = (T_u - T_b)/T_u$, with $T_u$ being the thickness of the photo-cured film before the baking, $T_b$ being the thickness of the film after baking.

The measured thermal shrinkage values are summarized in Tables 1, 2, and 3. It can be seen that especially the second set of photocurable compositions summarized in Table 2, had a very low thermal shrinkage of below 3 percent if photoinitiators OXE02 or OXE03 were used. However, photoinitiator OXE02 could not achieve a thermal shrinkage of below 4.5 percent if the monomer combination did not include the tri-functional vinyl monomer but instead a tri-functional acrylate monomer, see C9, C10, and C11 of Table 3. However, the thermal shrinkage when using photoinitiator OXE02 in this set of experiments was also lower in comparison to the use of photoinitiator Irgacure 907.

The best results were obtained with the combination of the biphenyl-benzene monomer containing three vinyl groups (3VPH) and oxime photoinitiators OXE02 or OXE03, wherein the thermal shrinkage was always below 3 percent. Not being bound to theory, the advantage of OXE02 and OXE03 oxime ester-type photoinitiators may be caused by the forming of $CO_2$ and $CH_3$-radicals during the photocuring. The small $CH_3$ radicals can migrate into the formed polymeric network to reach unreacted C=C groups hidden in the network; and the released $CO_2$ may cause the forming of sub-nanopores which can help to prevent the polymeric network to collapse before it is fully solidified.

Viscosities

The viscosities of the photocurable compositions were measured using a Brookfield Viscometer LVDV-II+Pro at 200 rpm, with a spindle size #18 and a spin speed of 135 rpm. For the viscosity testing, about 6-7 mL of sample liquid was added into the sample chamber, enough to cover the spindle head. The sample contained in the chamber was about 20 minutes equilibrated to reach the desired measuring temperature of 23° C. before the actual measurement was started. For all viscosity testing, at least three measurements were conducted and an average value was calculated.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any sub combination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A photocurable composition comprising a polymerizable material and at least one photoinitiator, wherein
   the polymerizable material comprises at least one multi-functional vinylbenzene monomer in an amount of at least 30 wt % based on the total weight of the polymerizable material;
   the at least one photoinitiator including an oxime ester compound;
   an amount of the polymerizable material is at least 85 wt % based on the total weight of the photocurable composition; and
   the photocurable composition is adapted that a UV shrinkage after forming a photo-cured layer at 23° C. is not greater than 4.0%.

2. The photocurable composition of claim 1, wherein the photocurable composition is adapted that the photo-cured layer formed from the photocurable composition has a thermal shrinkage after a baking treatment at 350° C. of not greater than 3.5%, the baking treatment including 2 minutes baking of the photo cured layer on a stainless steel plate having a temperature of 350° C. under N2 environment.

3. The photocurable composition of claim 1, wherein the oxime ester compound has a structure of formula (1):

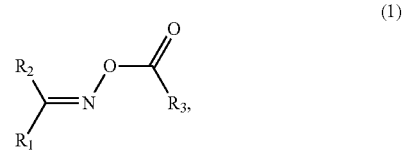

with $R_1$ being an aromatic ring system or a heteroaromatic ring system, $R_2$ being H or $C_1$-$C_8$ alkyl, $R_3$ being H or $C_1$-$C_8$ alkyl.

4. The photocurable composition of claim 3, wherein the oxime ester compound includes a structure of formula (2):

(2)

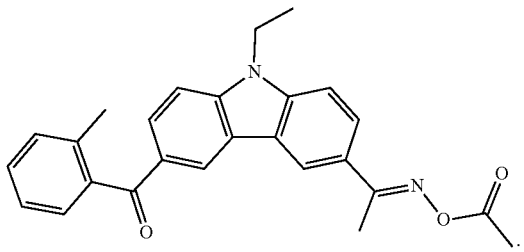

5. The photocurable composition of claim 3, wherein the oxime ester compound includes a structure of formula (3):

(3)

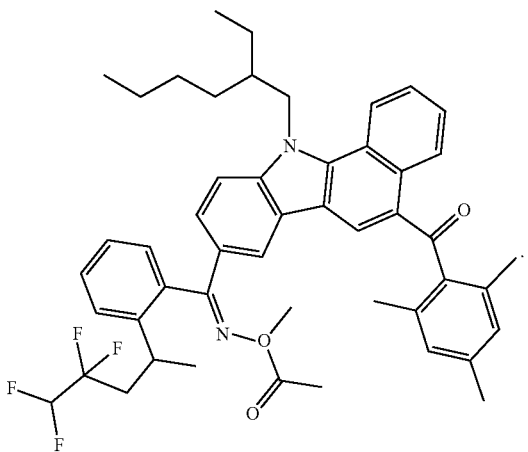

6. The photocurable composition of claim 1, further comprising at least 0.05 wt % 4-tert-butylcatechol (TBC).

7. The photocurable composition of claim 1, wherein an amount of the oxime ester compound is at least 1 wt % and not greater than 7 wt % based on a total weight of the photocurable composition.

8. The photocurable composition of claim 1, wherein the at least one photoinitiator further includes a photoinitiator not being an oxime ester compound.

9. The photocurable composition of claim 1, wherein the multi-functional vinylbenzene monomer includes at least three vinyl groups.

10. The photocurable composition of claim 9, wherein the multi-functional vinylbenzene monomer is a biphenyl compound including three vinyl groups.

11. The photocurable composition of claim 1, wherein the polymerizable material further includes at least one multi-functional acrylate monomer.

12. The photocurable composition of claim 11, wherein the multi-functional acrylate monomer includes at least one acrylate group and at least one vinyl group.

13. The photocurable composition of claim 11, wherein a total amount of the multi-functional vinylbenzene monomer and of the multi-functional acrylate monomer is at least 85 wt % based on the total weight of the polymerizable material.

14. The photocurable composition of claim 11, wherein a weight % ratio of the multi-functional vinylbenzene monomer to the multi-functional acrylate monomer ranges from 2:1 to 1:2.

15. The photocurable composition of claim 1, wherein a viscosity of the photocurable composition is not greater than 50 mPa s.

16. A method of forming a photo-cured layer on a substrate, comprising:
  applying a layer of a photocurable composition on the substrate, wherein the photocurable composition comprises a polymerizable material and at least one photoinitiator, the polymerizable material comprising at least one multi-functional vinylbenzene monomer in an amount of at least 30 wt % based on the total weight of the polymerizable material, the at least one photoinitiator including an oxime ester compound, and an amount of the polymerizable material is at least 85 wt % based on the total weight of the photocurable composition;
  bringing the photocurable composition into contact with a template or a superstrate;
  irradiating the photocurable composition with light to form a photo-cured layer; and
  removing the template or the superstrate from the photo-cured layer.

17. The method of claim 16, wherein irradiating the photocurable composition is conducted with UV light, and a UV shrinkage after forming the photo-cured layer is not greater than 4.0%.

18. The method of claim 16, wherein the photo-cured layer has a thermal shrinkage after a baking treatment at 350° C. of not greater than 3.5%, the baking treatment including 2 minutes baking of the photo-cured layer under $N_2$ on a stainless steel plate having a temperature of 350° C.

19. A method of manufacturing an article, comprising:
  applying a layer of a photocurable composition on the substrate, wherein the photocurable composition comprises a polymerizable material and at least one photoinitiator, the polymerizable material comprising at least one multi-functional vinylbenzene monomer in an amount of at least 30 wt % based on the total weight of the polymerizable material, the at least one photoinitiator including an oxime ester compound, and amount of the polymerizable material is at least 85 wt % based on the total weight of the photocurable composition;
  bringing the photocurable composition into contact with a template or a superstrate;
  irradiating the photocurable composition with light to form a photo-cured layer;
  removing the template or the superstrate from the photo-cured layer;
  forming a pattern on the substrate;
  processing the substrate on which the pattern has been formed in the forming; and
manufacturing an article from the substrate processed in the processing.

* * * * *